3,138,470
REFRACTORY
Ben Davies and Raymond E. Birch, Pittsburgh, Pa., assignors to Harbison-Walker Refractories Company, Pittsburgh, Pa., a corporation of Pennsylvania
No Drawing. Filed Mar. 14, 1962, Ser. No. 179,786
2 Claims. (Cl. 106—62)

This invention relates to refractory material and more particularly to a dense, yet essentially unfused refractory aggregate grain. The invention has particular utility in fabricating refractory bodies for use as checker brick in glass tank regenerator structures.

Refractory brick of forsterite (magnesium orthosilicate, $2MgO \cdot SiO_2$) have been known to the refractory art for some time. Previously natural products rich in forsterite, such as olivine, or magnesium hydrosilicates such as serpentine capable of yielding forsterite upon heating, have been used as an aggregate or base material for the fabrication of forsterite refractory brick.

In the last few decades, forsterite refractory brick have been used. Such brick consisted primarily of forsterite after firing, but also contained sizeable percentages of other less desirable mineral phases as a result of accessory oxides present in the natural ores. Attempts have been made to correct certain deficiencies of brick such as these by adding chrome ore or other non-acid refractory materials. One of the desirable characteristics of such brick is the relatively high refractoriness or melting point of the forsterite. They have also been valued for their good strength characteristics, as evidenced by their ability to resist subsidence or deformation when placed in high checker settings and held in soaking heat for many months. Forsterite brick also have the ability to chemically resist sodium sulfate, silica and other batch carryover materials in glass tank service.

Previous practitioners have suggested fabrication of a forsterite brick from Mg-Fe olivines which are naturally-occurring magnesium silicates containing iron oxide. They have also been fabricated from other natural magnesium silicates of relatively low refractoriness such as the hydrous magnesium silicates serpentine and talc, with the inclusion of sufficient magnesia to form forsterite by reaction. The relatively high iron oxide content of these natural magnesium silicates is of particular interest, since refractory brick prepared from them have proved very sensitive to alternating oxidizing-reducing atmospheres as exist, for example, in glass tank regenerators. This seems to be a result of the ease with which iron oxide changes in oxidation level, but at any rate brick having this characteristic will gradually expand and crumble when subjected to repeated changes from oxidizing to reducing atmospheres.

Osborn, United States Patent No. 2,516,249, teaches additions to brick made from natural magnesium silicates for the purpose of tying up the iron phase in a less sensitive form. This teaching has been quite useful and hundreds of thousands of brick made following it have been used in regenerators with good success. Even when tied up in less sensitive mineral phases, however, the iron content of such brick is a limiting factor, and as a trend toward higher regenerator temperatures develops, and often more pollution of the furnace gases with batch constituents occurs; it has become increasingly apparent that the natural magnesium silicate rocks have reached the limit of their usefulness because of inherent iron content.

As increasing appreciation was exhibited by the industry for improved forsterite refractory bodies, synthetic forsterite became of interest. Synthetic forsterite may be made by firing a mixture of high purity silica and high purity synthetic magnesia. Austin, United States Patent No. 2,571,102, is indicative of prior development in the synthetic forsterite field. The British Patent 602,453 of May 27, 1948, is an earlier example of synthetic forsterite development. This latter British patent contains an excellent review of the earlier work in the field of forsterite study, starting as early as 1834. Each of the three above noted patents has disclosed considerable regard as to various impurities and adulterating inclusions present in the raw materials used in obtaining forsterite commercially.

British Patent 732,590 of June 29, 1955, also relates to previous work in the forsterite field. This latter patent expresses the criticality of the range of impurities and, in particular, that inclusions of alumina or $Al_2O_3$ must be minimized. Prior concern over $Al_2O_3$ inclusions is also noted in the U.S. patent to Austin No. 2,571,102.

A primary problem of prior workers has been the difficulty of obtaining refractory brick from synthetic forsterite grain which are sufficiently dense to resist infiltration by the furnace fume and to withstand heavy loads at high temperatures for long periods of time. Further, such brick in the past have been uniformly sensitive to temperature fluctuations encountered within normal firing practice, and have been found to "cube" or crack apart in service. Some workers have suggested producing a dense grain by melting or fusion, while others have discovered that a dense grain can be produced short of substantial melting if the silica component of the grain batch is supplied in the form of such exotics as volatilized silica or geyserite. Most attempts to employ potters flint or other ordinary silica flours of commerce have resulted in synthetic forsterite grains of insufficient density to be valuable in the manufacture of regenerator refractories.

Thus, collectively, the most pertinent prior art in the field of forsterite, and in particular synthetic forsterite, has been diligently directed at the problems of failure or less-than-desirable service life under actual operating conditions. Most of these workers have considered the impurity factor as of a critical nature, which we have substantiated in our own experimental work.

Accordingly, it is an object of this invention to provide improved refractory material. It is further an object of this invention to provide an improved synthetic forsterite aggregate grain or base material for use in subsequent fabrication of refractory bodies.

It is still another object of the invention to provide an essentially unfused yet dense refractory aggregate grain consisting essentially on an oxide basis of magnesium oxide, silicon dioxide and alumina.

A still further object of the invention is to provide refractory materials which are highly resistant to cyclic temperature and atmosphere changes; which materials resist subsidence under load; which materials resist the slagging effects of lime, silica and soda carryover; which materials are essentially pure and dense; and the raw materials for which are more readily and inexpensively available.

Contrary to the teachings and understanding of prior art workers, we have discovered that alumina is not correctly identified as an impurity with such as iron, titania, lime, etc., as deleterious to synthetic forsterite. Further, we have discovered that the problem of proper fabrication of a forsterite complex is critical in the initial stage of actually fabricating the aggregate grain or base material which is subsequently to be utilized in manufacture of the desired refractory item; and that substantial amounts of alumina in the form of aluminum oxide, aluminum hydrate, or high purity kaolin, greatly facilitates the manufacture of dense synthetic grain without harming other essential characteristics.

In essence, our invention resides in the discovery that extremely fine-grained starting materials, substantially free of iron oxide, are necessary, and that such materials, together with preferably about 5 to 10 percent, and as high as 15 percent $Al_2O_3$-containing materials, such as commercially available kaolin, will provide a very dense refractory and cyclicly-stable aggregate grain. We have discovered that such a mixture is self-shrinking in forming, melting or advanced fusion so as to inherently form a dense grain structure of less than 13 percent porosity. The basic mixture also exhibits no eutectic below 3090° F., making it extremely useful in glass tank regenerator installations.

The following outline summarizes the laboratory test which was devised to simulate the temperature fluctuations normally found in a glass tank. The temperature fluctuation test was utilized to demonstrate the comparative resistance of various brick to cracking and loss of strength when subjected to temperature cycled between 2350° F. and 2600° F. The test specimens were 9 x 0.5 x 0.5 inch bars sawed from refractory brick, made by standard procedures from the grain materials prepared as described.

In the following examples, the magnesia-containing material was high purity (95+ percent) magnesium hydroxide precipitated from seawater which had been washed and dried, but not calcined. This hydrate was mixed with high purity silica sand (99+ percent $SiO_2$) supplied by the Pennsylvania Glass Sand Company as a 15 micron grade, and a high-purity air-floated kaolin (96+ percent kaolinite) supplied by The Thomas Alabama Kaolin Company. The particle size of the magnesium hydroxide precipitate was essentially finer than 5 microns. The particle size of the kaolin was about the same. The chemical analysis of each of the constituents, on an oxide basis, is as follows:

| | Magnesium Hydrate, percent | Silica Sand, percent | Kaolin, percent |
|---|---|---|---|
| Silica ($SiO_2$) | 1.6 | 99.92 | 53.3 |
| Alumina ($Al_2O_3$) | 0.3 | 0.04 | 43.6 |
| Titania ($TiO_2$) | | | 2.1 |
| Iron Oxide ($Fe_2O_3$) | 0.6 | 0.02 | 1.0 |
| Lime (CaO) | 1.4 | Trace | 0.1 |
| Magnesia (MgO) | 96.1 | Trace | 0.08 |
| Alkalies ($Na_2O$, $K_2O$) | | | 0.11 |

*Example I*

The components were thoroughly wet mixed to produce a batch consisting of 72.5 percent magnesium hydroxide, 17.5 percent silica, and 10 percent kaolin, by weight. The batch was then dried, pressed into shaped forms or dobies at 8000 p.s.i., and fired at 2910° F. The dobies were then crushed to obtain aggregate grain particles in a brickmaking graded mesh range.

Brick measuring 9 x 4½ x 2½ inches were fabricated from the resulting aggregate grains by pressing at 8000 p.s.i., and firing at about 2900° F. A chemical analysis of the brick, on an oxide basis, was as follows:

| | | |
|---|---|---|
| Silica ($SiO_2$) | percent | 30.7 |
| Alumina ($Al_2O_3$) | do | 5.3 |
| Titania ($TiO_2$) | do | 0.1 |
| Iron oxide ($Fe_2O_3$) | do | 0.6 |
| Lime (CaO) | do | 1.1 |
| Magnesia (MgO) | do | 62.5 |
| MgO/$SiO_2$ ratio | | 67/33 |

The physical properties of the brick were as follows:

Bulk density, p.c.f. _____ 167.
Modulus of rupture, p.s.i. _____ 3040.
Permeability (in.³/sec./in.²/in./lb. pressure) _____ 0.39.
Apparent porosity _____ 12.8%.
Cyclic temperature test:
   Percent linear change _____ +0.3.
   Appearance after test _____ Strong and uncracked.

It is important to note that the iron oxide content was only 0.6, and that the total of oxides which we recognize as impurities was on the order of 1.8%. The significance of these matters will be discussed subsequently.

*Example II*

In this example, magnesium hydroxide which had been dried but not calcined, and fine silica is wet mixed to provide an MgO:$SiO_2$ ratio of 75:25. 20 percent kaolin is thoroughly admixed, the mixture is partially dried, pressed into briquettes at 4000 p.s.i., and burned at 2910° F. The briquettes are then crushed and graded and the grain pressed into brick 9 x 4½ x 2½ inches, at 8000 p.s.i.

A chemical analysis of the brick, on an oxide basis, is listed below:

| | | |
|---|---|---|
| Silica ($SiO_2$) | percent | 28.6 |
| Alumina ($Al_2O_3$) | do | 8.7 |
| Titania ($TiO_2$) | do | 0.4 |
| Iron oxide ($Fe_2O_3$) | do | 0.3 |
| Lime (CaO) | do | 0.9 |
| Magnesia (MgO) | do | 61.5 |
| MgO/$SiO_2$ ratio | | 68/32 |

The physical properties of the brick are listed below:

Bulk density, p.c.f. _____ 168.
Modulus of rupture, p.s.i. _____ 2930.
Permeabilty _____ 0.36.
Porosity _____ 12.6.
Cyclic temperature test:
   Percent linear change _____ +0.2.
   Remarks _____ Strong and uncracked.

In Examples I and II, a kaolin clay of analysis typical of the large southern deposits was used in conjunction with magnesium hydroxide and fine ground silica sand to produce, upon firing, a modified synthetic forsterite grain of excellent characteristics for use in manufacturing refractories for regenerator service. These samples show that relatively high $Al_2O_3$ additions are permissible, and in fact useful, provided the total impurity content of the mixture is less than about 2 percent of which the iron oxide is less than about 0.6 percent. The term impurity content, as we use it, has a special meaning based on our specific invention. We view alumina ($Al_2O_3$) as an essential ingredient, and not as an impurity. Thus, for the purposes of our invention, the impurities are oxides other than MgO, $SiO_2$ and $Al_2O_3$.

With the substantial elimination of impurities and use of substantially iron oxide-free materials, from 5 to 15 percent of alumina in the form of kaolin clay may be successfully used. Thus, the kaolin addition may be from about 10 to 30 percent, by weight. In our examples the MgO to $SiO_2$ ratios, on a weight basis, were 67/33 and 68/32. However, ratios of from about 65/35 to 70/30 are successful.

One of the most amazing features of fabricating an aggregate grain according to our invention, is that a very dense grain structure results without vitrification, which results from advanced or complete fusion. In fact substantial melting would not occur below 3090° F. since the major ingredients, in the proportion in which we use them, do not have a eutectic below this temperature. This is substantially higher than that which is necessary for glass tank checker installations. The improved results are primarily based on the discovery, contrary to prior teachings, that alumina is not for these purposes, an impurity; and is in fact allowable and beneficial in substantial quantity with synthetic forsterite. Not only are desirable refractory properties obtained, but the product provides considerable economy in raw materials.

Having thus described the invention in detail and with sufficient particularity as to enable those skilled in the art to practice it, what is desired to have protected by Letters Patent is set forth in the following claims.

We claim:

1. An essentially unfused, yet dense, refractory aggregate grain suitable for use in fabricating refractory brickmaking batches for making shapes for use in glass tank regenerator structures, said grain made from a batch consisting essentially of MgO and $SiO_2$ in the approximate ratio, by weight, of from about 65 to 35 to about 70 to 30, on the basis of an oxide analysis, and from 5 to 15 percent by weight of alumina, said grain being essentially free of iron oxide impurities and the total impurities being less than about 2 percent, said grain having a porosity of less than 13 percent, and having no eutectic below about 3090° F.

2. An essentially unfused, yet dense, refractory aggregate grain suitable for using in fabricating brickmaking batches for making shapes for use in glass tank regenerator structures, said grain made from a batch consisting essentially of magnesium hydroxide analyzing at least about 95%, by weight, MgO, on the basis of an oxide analysis, silica sand analyzing at least 99% $SiO_2$, by weight and on the basis of an oxide analysis, and kaolin analyzing at least about 96% kaolinite, by weight, the kaolin constituting from 10 to 30%, by weight, of the batch, the magnesium hydroxide and silica sand consituting the remainder of the batch and being present in sufficient quantities such that, on the basis of an oxide analysis, a MgO to $SiO_2$ weight ratio of between 65 to 35 and 70 to 30 is present in the batch, said grain being substantially free of iron oxide impurity, the total impurities in the grain being less than about 2%, the grain having a porosity of less than about 13% and having no eutectic below about 3090° F.

References Cited in the file of this patent

UNITED STATES PATENTS 2,912,340   Pincus _____ Nov. 10, 1959